O. A. WILMING & J. H. BURKE.
TOOTH BRUSH.
APPLICATION FILED JAN. 16, 1915.
1,197,419.  Patented Sept. 5, 1916.
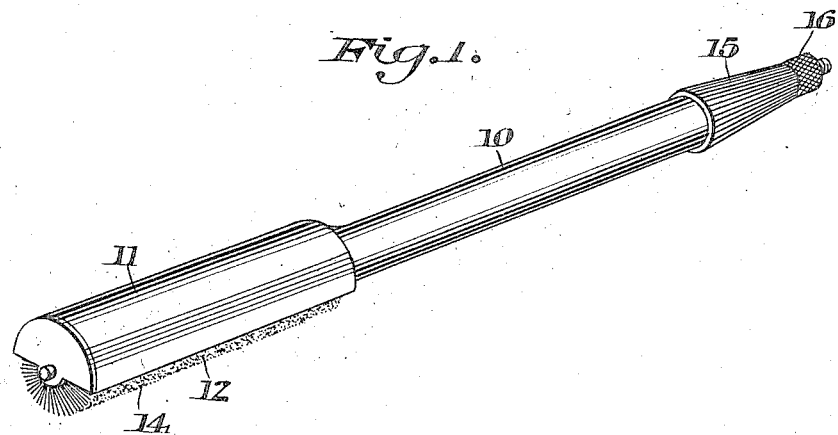
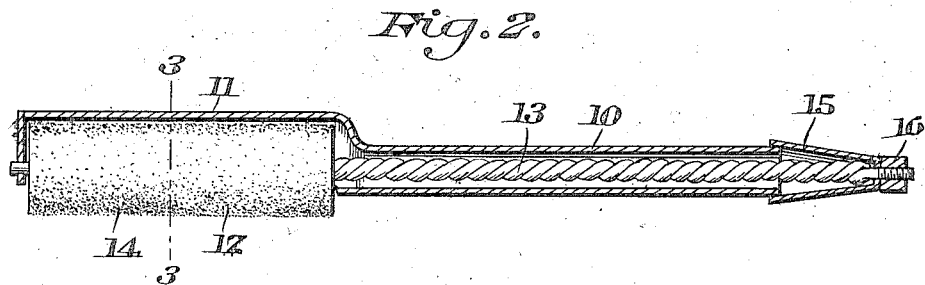
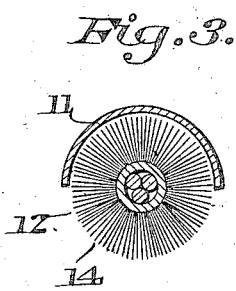

UNITED STATES PATENT OFFICE.

OTTO A. WILMING AND JOHN HAROLD BURKE, OF WILLITS, CALIFORNIA.

TOOTH-BRUSH.

1,197,419.

Specification of Letters Patent.

Patented Sept. 5, 1916.

Application filed January 16, 1915. Serial No. 2,707.

*To all whom it may concern:*

Be it known that we, OTTO A. WILMING and JOHN H. BURKE, citizens of the United States, residing at Willits, in the county of Mendocino and State of California, have invented new and useful Improvements in Tooth-Brushes, of which the following is a specification.

An object of the invention is to provide a tooth brush which can be effectively used to clean the teeth and remove particles of foreign matter from the interstices of the teeth, the tooth brush being so arranged and constructed that it can be readily operated, and kept in a clean and sanitary condition.

The invention contemplates, among other features, the provision of a brush body having a portion thereof lying in a suitable casing or hood, with means for imparting a rotating movement to the brush body, whereby the bristles operating upon the teeth will effectively clean the same and remove any particles of foreign matter therefrom.

In the further disclosure of the invention reference is to be had to the accompanying drawings, constituting a part of this specification, in which similar characters of reference denote corresponding parts in all the views, and in which:

Figure 1 is a perspective view of the brush; Fig. 2 is a vertical longitudinal sectional view; and Fig. 3 is a vertical transverse sectional view taken on the line 3—3 in Fig. 2.

Referring more particularly to the drawings, we provide a tubular handle 10 having one end thereof terminating in an enlarged semi-circular integral hood 11. The brush is indicated by the numeral 12 and consists, more particularly, of a twisted shank 13 preferably formed of a plurality of relatively twisted strands of wire, with a portion of said shank carrying the radiating bristles 14. The shank 13 extends loosely through the handle 10, with the brush body 14 lying in the recess of the hood 11 and partially covered thereby. One end of the shank 13 projects beyond the end of the handle and arranged thereon is a frusto-conical serrated actuating member 15, a suitable nut 16 being threaded on the shank to secure the member 16 in position, said member having a portion thereof projecting over the end of the handle as shown.

In the use of the brush described, the same is grasped by the handle 10 and the thumb and index finger of one hand are arranged to grasp the member 15 to impart a rotating movement thereto, thus causing the brush body 14 to rotate in the hood 11, with the exposed portion of the brush body adapted to operate upon the teeth and effectively cleanse the same.

It will of course be understood that a suitable tooth powder or the like can be used in connection with the brush and it will be clearly seen that by removing the nut 16 and member 15 from the shank 13, the shank and brush body can be bodily removed from the handle and hood for sterilizing or otherwise cleaning the same.

Having thus described our invention, we claim:

A brush comprising a tubular handle, a hood on one end of the handle, a shank revoluble in the tubular handle and having one end projecting beyond the handle, a portion of said shank extending into the hood, a brush body carried by the portion of the shank extending into the hood, a nut threadably mounted upon one extremity of the shank, and a frusto-conical member mounted on said shank between said nut and the handle, the larger end of said member encircling the outer extremity of said handle.

In testimony whereof we affix our signatures in presence of two witnesses.

OTTO A. WILMING.
JOHN HAROLD BURKE.

Witnesses:
FRANK H. WHITNEY,
ETTA M. WHITNEY.